Patented Oct. 17, 1933

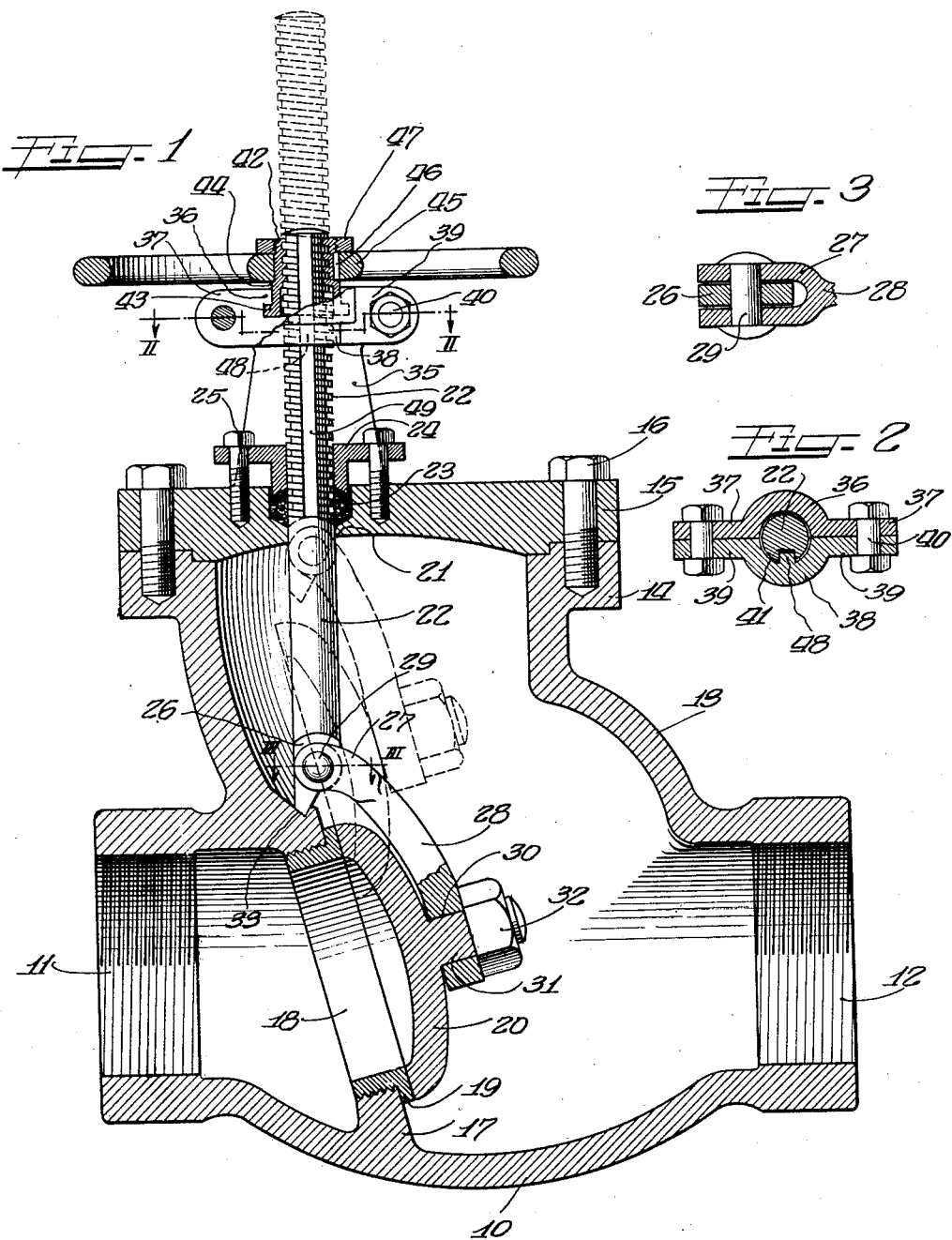

1,930,506

UNITED STATES PATENT OFFICE 1,930,506

VALVE

William Brown, William H. Hough, and Ralph Hough, Seminole, Okla.

Application April 18, 1931. Serial No. 531,064

1 Claim. (Cl. 251—125)

Our invention relates to valves and particularly to the swinging type check valve, and the object is to provide improved and more efficient construction and improved means for shifting the swing valve off its seat for the reverse flow of fluid through the valve body.

More in detail an important object of the invention is to provide a structure in which the check valve may be shifted along its seat for exposing more or less of the valve port for the reverse flow of fluid.

Another important object is to provide an arrangement in which the check valve is shifted upwardly along its seat in a direction substantially transverse to the direction of fluid flow through the valve body and port.

Still another object is to provide an arrangement in which the check valve is pivotally suspended from the lower end of an axially shiftable valve spindle so that when the spindle is shifted the check valve will be moved upwardly or downwardly along its valve seat to expose more or less of the valve port.

Still another object is to provide a construction in which the setting spindle for the valve is supported by a removable cover for the valve body so that the cover with the spindle structure and the valve hinged thereto may be lifted from the valve body for inspection or repairs.

Still a further object is to provide for securely anchoring the lower end of the setting spindle when the valve is in its lowermost position to fully close the valve port against flow of fluid in one direction through the valve body.

The above enumerated and other important features of our invention are incorporated in the structure shown on the drawing, in which drawing:

Figure 1 is a vertical diametral section of the valve structure;

Figure 2 is a section on plane II—II of Figure 1; and

Figure 3 is an enlarged section on plane III—III of Figure 1, showing the pivot connection between the valve spindle and valve supporting arm.

The valve structure shown comprises the valve body 10 having the inlet 11 and the outlet 12, and the vertical extension or neck 13 terminating in a flange 14 for seating a cover or cap 15 which may be detachably secured by means of screws 16.

Within the valve body near the inlet end thereof and preferably below the corresponding side of the neck 13 is the transverse partition 17 having an opening for receiving the annular valve seat bushing 18 extended by a flange 19 at its inner end to form a comparatively wide annular seating surface for the check valve 20 which is shown as dome shaped and whose edge forms a smooth surface for intimately engaging the seating surface of the seat 18. As shown the seat bushing may be secured by threading engagement with the partition 17. The seat bushing is preferably sufficiently inclined so that gravity will tend to hold the valve seated.

Vertically above the valve seat the cap 15 has the passageway 21 for the valve spindle or stem 22 which is cylindrical and which at its upper end is threaded. A pocket 23 in the cap surrounds the stem above the passageway 21 for receiving packing material which is compressed in the pocket by means of a gland 24 secured by screws 25, such packing preventing escape of fluid past the valve spindle.

The lower end 26 of the spindle is flattened to engage in the bifurcated end 27 of an arm 28, a pivot pin, bolt or rivet 29 extending through the spindle end and bifurcated end to support the arm 28 for vertical swing. At its lower end the arm 28 has the opening 30 for receiving the cylindrical stud 31 extending outwardly from the valve body 20 at the axis thereof, the outer end of the stud being threaded for the reception of a nut 32 by means of which the arm is held to the stud. There may be slight clearance between the arm and the stud so that the arm will not interfere with the accurate seating of the valve on its seat 18.

The body 10 just above the valve seat forms a supporting ledge for the end of the valve spindle when the spindle is in its lowermost position for complete closure by the valve of the passageway or port through the seating bushing 18, and preferably the ledge has the V shaped transverse notch 33 for receiving the correspondingly shaped lower end of the spindle and for guiding the spindle accurately to its lower position.

The cap 15 has a vertical frame or wall 35 extending therefrom alongside of the spindle, the upper semi-annular end 36 of this wall having lateral flanges 37 extending therefrom. A companion semi-annular frame or plate 38 has the lateral flanges 39, these semi-annular flange parts 36 and 38 when opposed to each other forming a support for the spindle shifting mechanism, and the frame parts are held together by their lateral flanges which are secured as by bolts 40. At their lower ends the walls 36, 38 form the passageway 41 for the valve spindle 22.

At the upper part of the frames 36, 38 the passage is widened to receive the screw sleeve 42 which has the retaining flange 43 at its lower end and which a distance above the frame 36 has the annular shoulder 44 forming a seat for a hand wheel 45. The hand wheel is locked on the sleeve against rotational movement by a key 46, and a nut 47 engaging the threaded upper end of the sleeve clamps the wheel hub to the shoulder 44.

Referring to Figure 2 the frame member 38 has a key or tongue 48 extending radially inwardly for engagement in the longitudinally extending keyway 49 of the valve spindle so that the spindle may move axially through the guide frame but is restrained from rotational movement. Now when the hand wheel is turned, the screw sleeve 42 turns therewith, but as the sleeve is restrained from axial movement by its flange 43, and the spindle is restrained against rotational movement, the result will be that the spindle is shifted axially to adjust the position of the valve 20 relative to its seat bushing 18. On Figure 1 the full lines show the spindle in its normal position with its end anchored in the notch 33 and the valve being in its fully closed position. Now when the hand wheel is turned in counterclockwise direction the spindle will be shifted upwardly and the valve will be shifted along its seat to expose the port or passageway through the seat frame 18 for reverse fluid flow. The valve may thus be readily opened to any desired degree for reverse flow. When the valve is fully closed it will check such reverse flow. The valve however is at all times free to swing to permit flow in the other or normal direction. As the valve seat is slightly inclined gravity will always tend to hold the valve against the seat so that upon shifting of the valve spindle the valve will be readily guided when it is raised or lowered. The raising or lowering of the valve is also substantially in a direction transverse to the flow of fluid through the valve body so that there will be very little resistance to the shifting of the valve when the hand wheel is turned.

It will be noted that all the operating parts of the valve structure are carried by the cap 15 and that the passageway through the extension 13 is such that when the cap bolts are withdrawn the cap spindle and valve may be removed as a unitary structure from the valve body so that inspection, cleaning or repairs can be quickly and readily made.

While an efficient and practical embodiment of the various features of our invention has been illustrated and described it is understood that the construction and arrangement may be varied within the scope of the appended claim without departing from the spirit of the invention.

We claim as follows:

In a valve structure of the class described, the combination of a valve body having a horizontal fluid passageway therethrough, a valve seat transversely interposed in said fluid passageway and defining a passage port, a valve for engaging said seat to close said port passage against fluid flow in one direction, a stem extending downwardly through the top of said valve body, an arm extending from said valve and hinged to the lower end of said stem whereby said valve may swing in response to fluid flow through said fluid passageway, a ledge on said valve body above said seat for receiving and securing the lower end of said stem when said stem is in its lowermost position, said valve during such position of the stem being adapted to fully close said port passage, and means at the exterior of said valve body connected with said stem for causing upward movement thereof to raise said valve along its seat to expose said port passage for reverse fluid flow through the valve body.

WILLIAM BROWN.
WILLIAM H. HOUGH.
RALPH HOUGH.